Sept. 14, 1965   H. G. DAWES   3,206,609
RECIPROCATING ENGINE-GENERATOR
Filed April 9, 1962   2 Sheets-Sheet 1
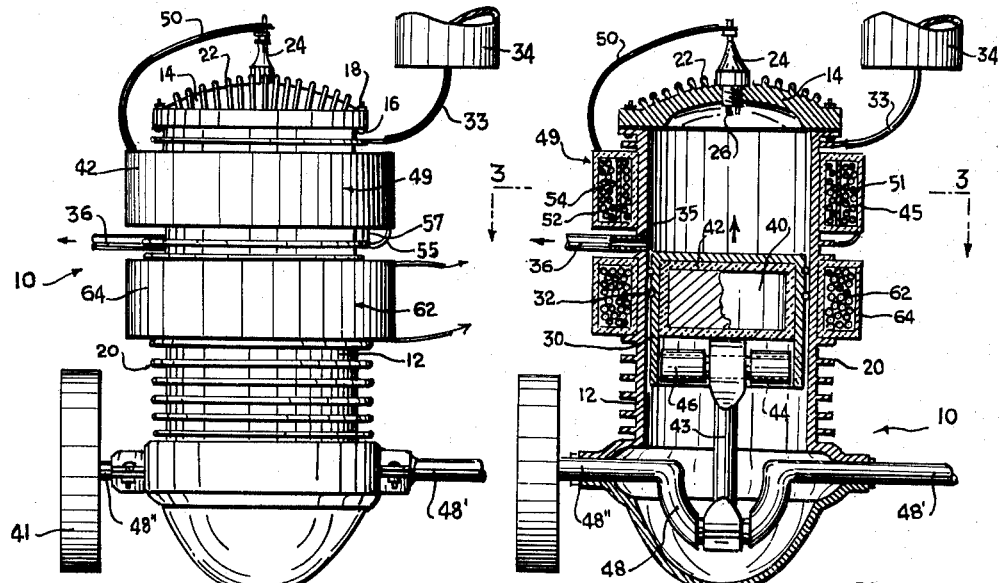
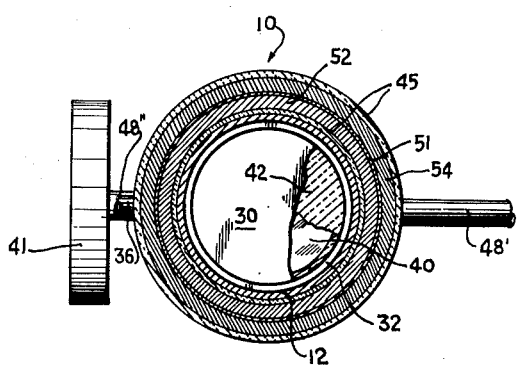
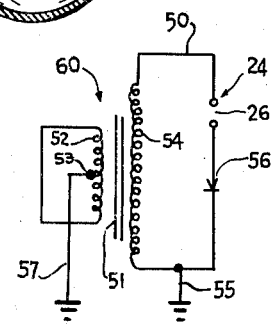
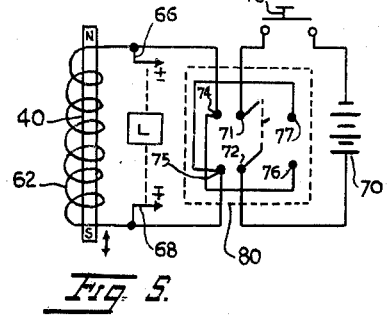
INVENTOR.
HERBERT G. DAWES
BY
ATTORNEY

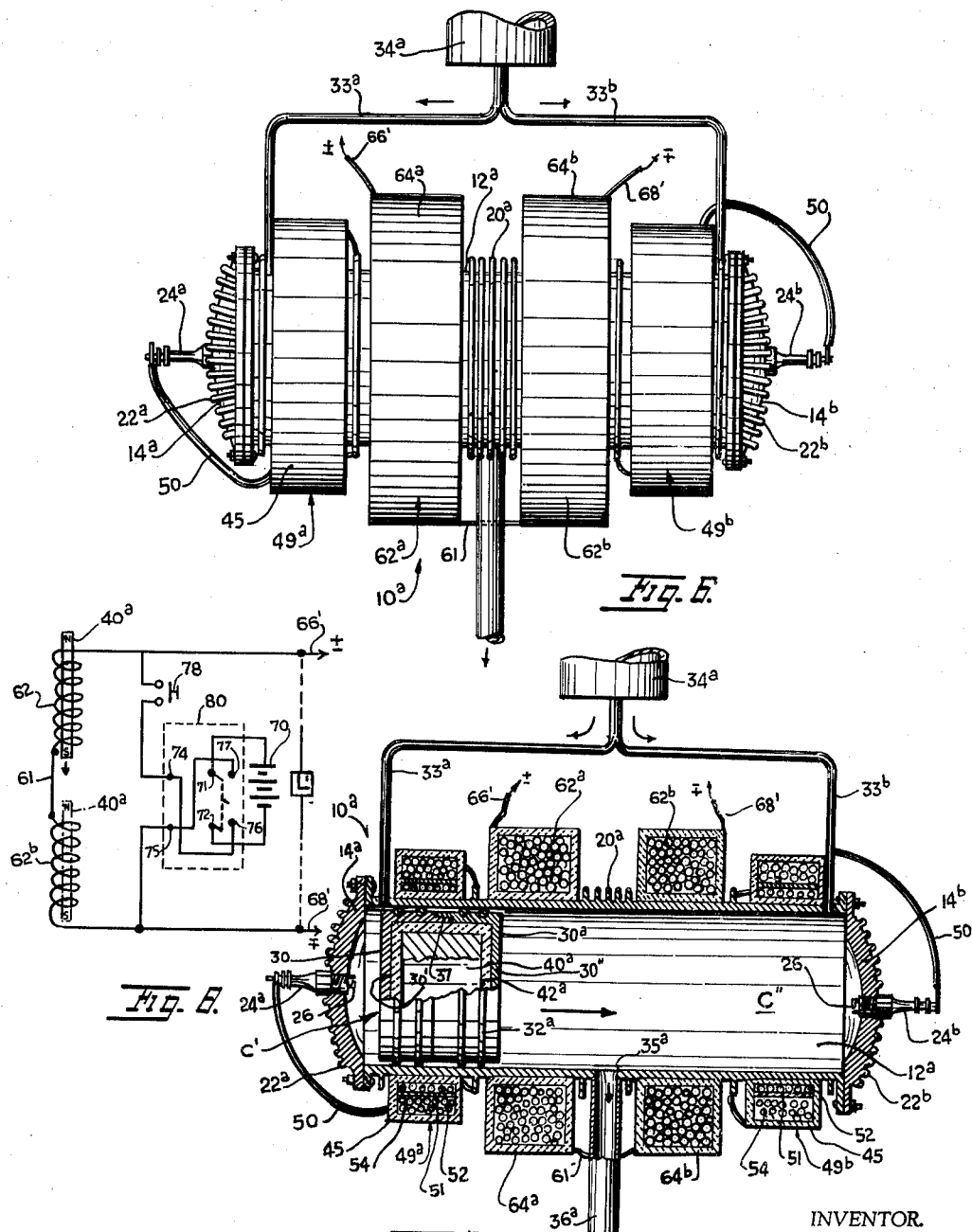

United States Patent Office 3,206,609
Patented Sept. 14, 1965

3,206,609
RECIPROCATING ENGINE-GENERATOR
Herbert G. Dawes, Miami, Fla. (Rte. 1, Uniondale, Pa.)
Filed Apr. 9, 1962, Ser. No. 185,995
4 Claims. (Cl. 290—1)

This invention relates to motor-generator apparatus and more particularly concerns a device for generating alternating current by means of a reciprocating magnet in a piston driving engine.

A principal object of the invention is to produce electricity by means of an engine having a reciprocating piston.

Another object is to produce electricity in an engine which has a reciprocating piston magnet as the sole moving part thereof.

A further object is to provide an internal combustion engine having a cylinder for burning fuel and containing a reciprocating piston including a magnet to generate electric current in associated coils.

A still further object is to provide an engine as described wherein part of the current is employed in an ignition circuit for firing the fuel in the cylinder.

Another object is to provide an engine of the character described wherein the engine is rendered self-starting by means of a starting circuit connected to the coils.

A further object is to provide a two cycle engine wherein a free reciprocating piston including a magnet is driven in a cylinder to generate electric current in associated coils around the cylinder.

According to the invention there is provided an engine having a cylinder in which is a cylindrical piston containing a magnet. The magnet may be permanently magnetized or may be an electromagnet. The piston is reciprocated in the cylinder by combustion of fuel but it may be driven by other means such as compressed air, wind or water power, and the like. The driven piston may be coupled to a shaft in a single cycle engine for taking off mechanical power from the engine. In addition, electric current will be generated for use in an external load circuit to energize the electrical load. Electric current may be generated in an ignition circuit for electrically igniting fuel in the engine cylinder. A starting circuit may be connected to the load circuit for temporarily driving the piston to start the engine. In another form of the invention, the piston may be free and employed in a two-cycle engine solely for generating electric current without any takeoff of mechanical power. This two-cycle engine may also be self-starting and may include self-igniting circuits.

For further comprehensive of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of an engine embodying the invention.

FIG. 2 is a longitudinal central sectional view of the engine, parts being shown in side elevation.

FIG. 3 is a cross-sectional view taken on line 3—3 of FIG. 2.

FIG. 4 is a diagram of an ignition circuit employed in the engine.

FIG. 5 is a diagram of a load and starting circuit employed in the engine.

FIG. 6 is a side elevational view of another engine according to the invention.

FIG. 7 is a longitudinal central sectional view of the engine of FIG. 6.

FIG. 8 is a diagram of a load and starting circuit employed in the engine of FIGS. 6 and 7.

Referring to FIGS. 1–3, there is shown a single cycle air-cooled engine 10 including a cylinder 12 having an end head 14 secured thereto by bolts 16 and nuts 18. Ribs or fins 20, 22 are provided on the cylinder and head to radiate heat. A spark plug 24 is mounted in the head and its spaced terminals 26 are exposed to the interior combustion chamber C of the cylinder. Axially movable inside the cylinder is a cylindrical piston 30. The piston has a flat circular top exposed to the combustion chamber. Piston rings 32 encircle the piston and form a tight seal between the piston and wall of the cylinder. A fluid fuel inlet pipe 33 connected to a carburetor 34 or other fuel supply source terminates at the cylinder and opens into chamber C. The cylinder has an exhaust port 35 in which exhaust pipe 36 is connected.

The piston 30 is an inverted cup-shaped member in which is secured a cylindrical magnet 40. Around the magnet is a thermal insulating jacket 42 which shields the magnet from engine heat. Wrist pin 44 is secured to the lower open end of the piston. A piston rod 43 is connected to pin 44. Around the pin are cylindrical shims or bushings 46 which keep the piston rod centered on pin 44 in the piston. The lower end of the piston rod is engaged on a crankshaft 48. One end 48' of the crankshaft may be used to take off mechanical power by connection of a suitable mechanical load (not shown) thereto. The other end 48" of the shaft carries a massive flywheel 41.

Secured to the cylinder 12 and extending around the upper part thereof is a transformer 49 including a pair of concentric annular coils 52, 54 having a cylindrical soft iron separator 51 therebetween. Coils 52, 54 form parts of an ignition circuit 60, see FIG. 4. A thermal insulating jacket 45 surrounds the transformer to protect is from heat of the engine.

As shown in FIG. 4, ignition circuit 60 includes a rectifier 56 connected in series with the spaced terminals 26 of spark plug 24. One end of coil 54 is grounded via wire 545. Wire 50 connects coil 54 and spark plug 24. Coil 52 is center-tapped at 53 and this tap is grounded by wire 57. Iron core 51 is shown between the coils. Coil 54 has many more turns than coil 52, so that the coil assembly 52, 54 serves as a step-up transformer in which coil 52 is the primary coil and coil 54 is the secondary coil.

Another annular coil 62 enclosed in a thermal insulating jacket 64 is mounted on the cylinder. As shown in FIGS. 2 and 5, this coil terminates in a pair of terminal leads 66, 68. A load circuit L may be connected across these terminal leads for application thereto of alternating electric current generated in the coil 62.

An engine starting circuit is connected to terminal leads 66, 68. This circuit, as shown in FIG. 5, includes a battery 70 connected to central terminals 71, 72 of a double-pole reversing switch 80 having an operating button or handle 73. Terminals 74, 75 of the switch are connected to leads 66, 68. Terminals 74, 75 are connected to reversing switch terminals 76, 77. A circuit enabling normally open push button switch 78 is connected in series with the battery 70. FIG. 5 shows the magnet 40 schematically associated with coil 62.

In operation of the engine 10, the engine may be started by manually closing push button switch 78 to close the starting circuit and then manually throwing switch 80 to either position. If piston 30 is in the lowermost position shown in FIG. 2, the coil 62 will become energized as current from battery 70 passes therethrough. The magnet is axially polarized with its upper end a north pole N and lower end a south pole S. Suppose switch terminals 71, 74 and 72, 75 are closed, so that a magnetic field is generated by the current flowing in coil 62, with the magnetic field polarized the same as magnet 40, the magnet will be repelled and driven axially upward. This will cause the piston 30 to rise. As the piston rises with magnet 40, the magnetic field of the magnet will intersect the transformer coil 52 and a voltage will be generated therein. The voltage will be stepped up in coil 54 by mutual induction and a spark will appear across terminals 26 of the spark plug 24. If fuel is fed into the chamber C via pipe 33 before or during the sparking of the spark plug, the fuel will be ignited and the cycling of the engine will start. The push button switch 78 can then be released to open the starting circuit. If the engine does not start when the switch 80 is thrown to the first position, the switch should be reversed to close terminals 71, 77 and 72, 76. It may be necessary to reverse the switch 80 several times until the firing of the engine becomes regularized.

While the engine is operating after starting, the fuel in chamber C will be ignited each time the fuel is compressed upon elevation of the piston. Ignition of the fuel will be accompanied by rapid expansion of the ignited fuel and driving of the piston downwardly. The piston will drive the crankshaft 48 and mechanical power can be taken off shaft end 48'. Flywheel 41 tends to keep the shaft 48 rotating at constant speed. Each time the magnet moves axially up or down, an electrical voltage is generated in the coils 52 and 62. If a load L such as a lamp or other power consuming device is connected across load terminals 66, 68 of coil 62, the load will be energized by alternating current, since the electrical voltage generated at terminals 66, 68 reverses in polarity each time the magnet changes its direction of motion. The moving magnetic field accompanying the magnet intersects the coil 62 and changes amplitude rapidly as the magnet moves upwardly out of the plane of the coil and downwardly into the plane of the coil. Alternating voltages each having a sine wave characteristic are induced in coils 52 and 62. The engine 10 thus serves as both a generator of mechanical power, as a generator of electrical power for external loads, and as a generator for energizing its own ignition circuit.

While the engine has been shown as air cooled, this has been done only by way of example and for the sake of simplicity in explanation. The engine may be liquid cooled. Instead of supplying ignitable fuel to chamber C, it may be supplied with compressed air or with liquid to drive the piston and magnet. An engine having a plurality of cylinders 12 may be provided. Pistons 30 will all be connected to one crankshaft 48 to increase the mechanical power output of the engine. The output terminals 66, 68 of the load circuits will be connected in parallel to increase the electrical power output of the multi-cylinder engine.

FIGS. 6 and 7 show another engine 10ª in which parts corresponding to those of engine 10 are identically numbered. The engine 10ª has a cylinder 12ª and a free cylindrical piston 30ª with two sections 30', 30'' connected together by a screw joint 37. Cylinder 12ª has heads 14ª and 14ᵇ at opposite ends. The piston rod and crankshaft used in engine 10 are omitted. Spark plugs 24ª, 24ᵇ are provided in the two heads and their terminals 26 project into chambers C', C'' at opposite ends of cylinder 12ª. Magnet 40ª enclosed in thermal insulating jacket 42ª is disposed inside the piston. Piston rings 32ª encircle the piston to insure a tight seal between the piston and interior wall of the cylinder. Fuel inlet pipes 33ª, 33ᵇ supplied from a common fuel source 34ª are connected to opposite ends of the cylinder and open into the chambers C', C'' near heads 14ª, 14ᵇ. An exhaust pipe 36ª for spent fuel extends radially from the cylinder and is connected to a central point at exhaust port 35ª.

Transformers 49ª and 49ᵇ are mounted at opposite ends of the cylinder. Each transformer includes an inner primary coil 52 and an outer secondary coil 54. Wires 50 connect the secondary coils to the spark plugs respectively. Coils 62ª and 62ᵇ are connected together by a wire 61. Each of these coils has a thermal insulating jacket 64ª or 64ᵇ. The coils are axially spaced apart on either side of the central transverse plane of symmetry of the cylinder. The engine has two ignition circuits at opposite ends each identical with that shown in FIG. 4 and described above.

FIG. 8 shows the electrical load and starting circuit of engine 10ª. Parts corresponding to the load and starting circuit of FIG. 5 are identically numbered.

Engine 10ª is especially intended to produce alternating electrical current at load terminals 66', 68' and no mechanical power takeoff is provided. The electrical power producing capacity of engine 10ª is at least twice that of engine 10 since engine 10ª is a two-cycle engine while engine 10 is a single cycle engine. The piston 30ª is positively driven by ignited fuel in each axial movement of the piston. The piston travels from end to end of the cylinder. The magnet in the piston has an accompanying magnetic field which intersects transformers 49ª, 49ᵇ and coils 62ª, 62ᵇ in each axial movement of the piston and magnet. Alternating voltages are generated in transformer coils 52 and 54 and are rectified as shown in FIG. 5 to energize the spark plugs. Alternating current is generated in series connected coils 62ª, 62ᵇ for energizing load L'.

Starting of the engine 10ª is performed in the same manner as described in connection with FIG. 5. After the enabling push button switch 78 is closed the starting circuit is operated by throwing switch 80 to one position and then the other until firing of the spark plugs at both ends of the cylinder becomes regularized. Then the push button switch 78 is released and the piston 30ª is driven back and forth axially (right and left as shown in FIG. 7), as fuel is fed into each end of the cylinder in turn and each spark plug fires in turn. The spent burnt gases are exhausted through pipe 36ª from each combustion chamber C', C'' in turn as the piston moves into the other chamber. The engine may be liquid cooled instead of being air-cooled via fins or ribs 20ª, 22ª, 22ᵇ. Instead of burning fuel in chambers C', C'' they may be charged in turn with compressed gas or with liquid to constitute the engine, a pneumatic or hydraulic engine generator of electric power instead of being an internal combustion engine generator as shown.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An engine for generating electrical voltages, comprising a cylinder, a piston movable axially in said cylinder, means for supplying combustible fluid to said cylinder for driving the piston axially in the cylinder, a magnet carried by said piston, electrical means for igniting the fluid in the cylinder, a coil assembly around the cylinder, said magnet having a magnetic field extending radially outward of the cylinder for inducing an electrical voltage in said coil assembly during axial movement of the piston and magnet, said electrical means being connected in circuit with said coil assembly for applying said electrical voltage to said means and igniting said fluid in the cylinder, another coil around said cylinder disposed for intersection by said magnetic field, and a starting circuit connected across said other coil for initially moving said magnet and piston axially to generate electrical voltage in said coil assembly.

2. An engine for generating electrical voltages, comprising a cylinder, a piston movable axially in said cylinder, means for supplying combustible fluid to said cylinder for driving the piston axially in the cylinder, a magnet carried by said piston, electrical means for igniting the fluid in the cylinder, a coil assembly around the cylinder, said magnet having a magnetic field extending radially outward of the cylinder for inducing an electrical voltage in said coil assembly during axial movement of the piston and magnet, said electrical means being connected in circuit with said coil assembly for applying said electrical voltage to said means and igniting said fluid in the cylinder, another coil around said cylinder disposed for intersection by said magnetic field, a starting circuit connected across said other coil for initially moving said magnet and piston axially to generate electrical voltage in said coil assembly, a piston rod connected to said piston, and a crankshaft connected to said piston rod for taking off mechanical power while the piston is moving in said cylinder and electrical voltages are being generated in said coil assembly and other coil.

3. An engine for generating alternating electrical voltage, comprising a cylinder, a piston movable axially in said cylinder, means for supplying combustible fluid to opposite ends of the cylinder for driving the piston in opposite directions in the cylinder, a magnet carried by said piston, electrical igniters at opposite ends of the cylinder for igniting fluid at opposite ends of the cylinder, a pair of coil assemblies around opposite ends of the cylinder respectively, each of the coil assemblies being connected to one of the electrical igniters, said magnet having a radially extending magnetic field, whereby axial movement of the piston and magnet in the cylinder generates electrical voltages in the coil assemblies to energize said igniters and ignite the fluid at opposite ends of the cylinder, another coil assembly around the cylinder disposed axially between the first-named pair of coil assemblies, said magnet having a radially extending magnetic field, whereby axial movement of the piston and magnet in the cylinder generates another electrical voltage in the other coil assembly for energizing an external load connected to said other coil assembly, said other coil assembly having a pair of terminals, a starting circuit including a source of electric current, and switching means connected to said terminals for initially passing an electric current through the other coil assembly to generate another magnetic field cooperating with the first magnetic field for initially moving the magnet and piston in the cylinder to generate voltages in the first pair of coil assemblies whereby the fluid at opposite ends of the cylinder is ignited.

4. An engine for generating alternating electrical voltage, comprising a cylinder, a piston movable axially in said cylinder, means for supplying combustible fluid to opposite ends of the cylinder for driving the piston in opposite directions in the cylinder, a magnet carried by said piston, electrical igniters at opposite ends of the cylinder for igniting fluid at opposite ends of the cylinder, a pair of coil assemblies around opposite ends of the cylinder respectively, each of the coil assemblies being connected to one of the electrical igniters, said magnet having a radially extending magnetic field, whereby axial movement of the piston and magnet in the cylinder generates electrical voltages in the coil assemblies to energize said igniters and ignite the fluid at opposite ends of the cylinder, another coil assembly around the cylinder disposed axially between the first-named pair of coil assemblies, said magnet having a radially extending magnetic field, whereby axial movement of the piston and magnet in the cylinder generates another electrical voltage in the other coil assembly for energizing an external load connected to said other coil assembly, said other coil assembly having a pair of terminals, a starting circuit including a source of electric current, and switching means connected to said terminals for initially passing an electric current through the other coil assembly to generate another magnetic field cooperating with the first magnetic field for initially moving the magnet and piston in the cylinder to generate voltages in the first pair of coil assemblies whereby the fluid at opposite ends of the cylinder is ignited, each of said coil assemblies and said magnet being enclosed in a thermal insulation jacket to shield the same from heat developed in said engine during ignition of the fluid in the cylinder.

References Cited by the Examiner
UNITED STATES PATENTS

| 2,362,151 | 11/44 | Ostenberg | 290—1 |
| 2,860,267 | 11/58 | Hayes | 310—43 |
| 2,900,592 | 8/59 | Baruch | 290—1 |
| 3,105,153 | 9/63 | James | 290—1 |

FOREIGN PATENTS

| 654,895 | 12/28 | France. | |

ORIS L. RADER, *Primary Examiner.*

MILTON O. HIRSHFIELD, *Examiner.*